April 13, 1965 G. KEHR ETAL 3,177,773
BURRING AND FINISHING MACHINE
Filed Dec. 5, 1961 5 Sheets-Sheet 1

Inventors:
Günther Kehr
Heinrich Wichmann
by: Michael S. Striker
Attorney

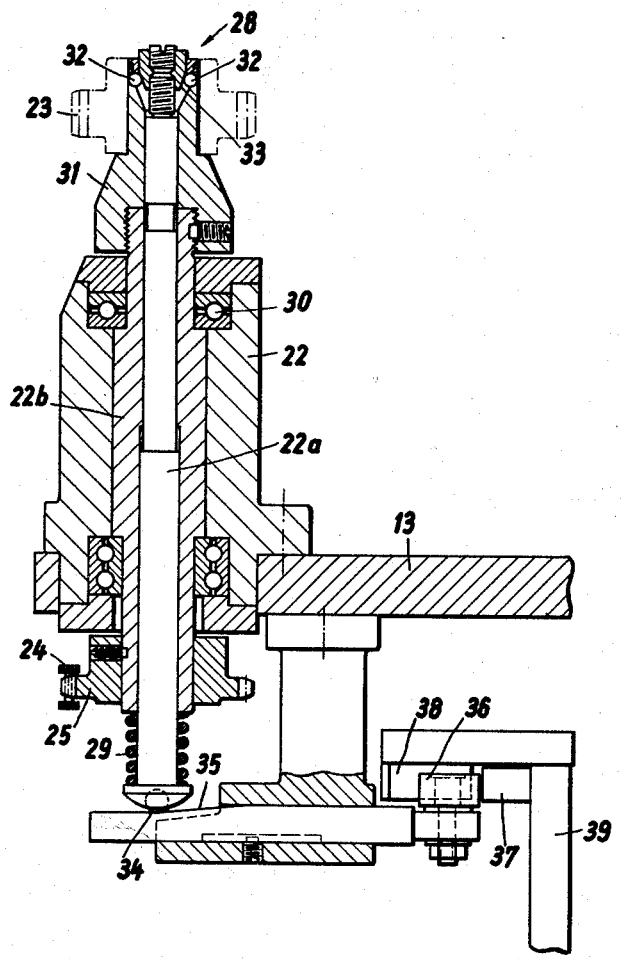

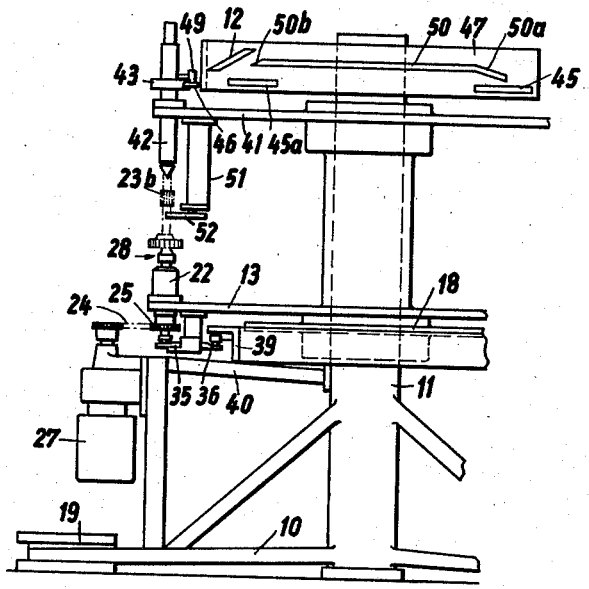
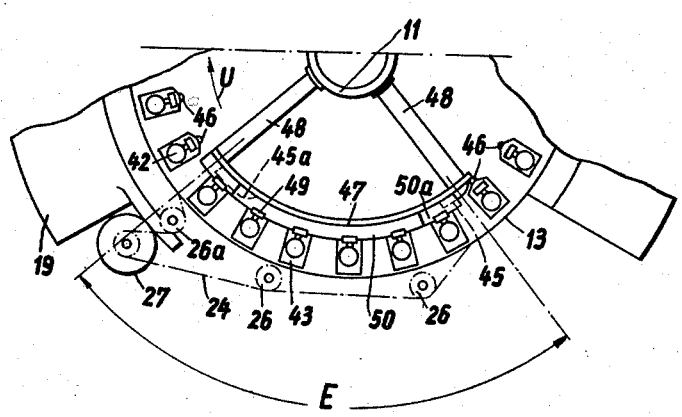

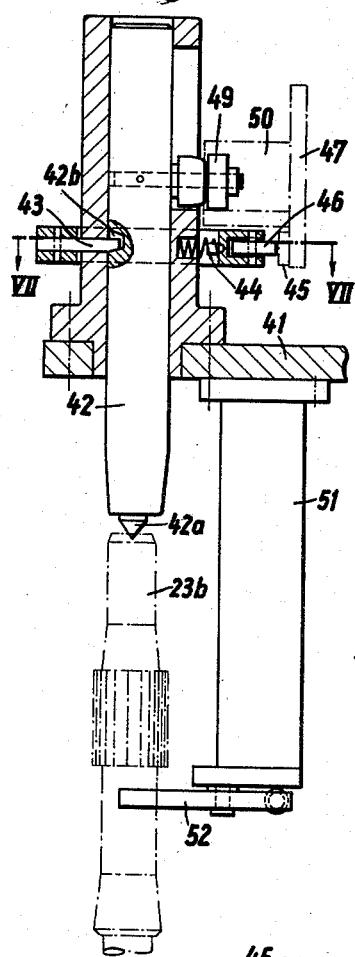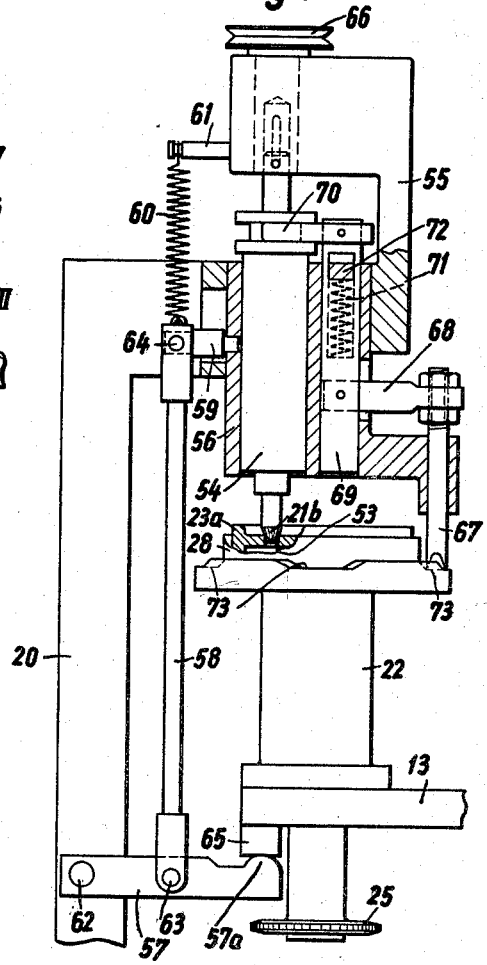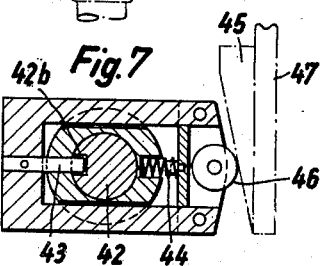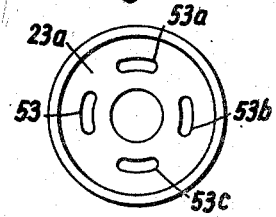

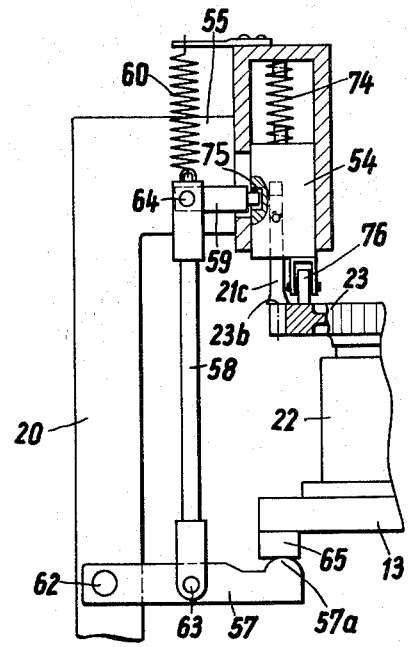

United States Patent Office 3,177,773
Patented Apr. 13, 1965

---

3,177,773
BURRING AND FINISHING MACHINE
Günther Kehr, Klaus-Groth-Strasse 59, Bremen, and Christian Heinrich Wichmann, Braunschweiger Strasse 76, Thedinghausen, Germany
Filed Dec. 5, 1961, Ser. No. 157,078
Claims priority, application Germany, July 29, 1961, K 38,873
6 Claims. (Cl. 90—1.4)

The present invention relates to a machine for burring and finishing workpieces, and especially round workpieces such as gears, disks, or the like in several successive operations by means of a plurality of tools, for example, roller brushes, milling cutters, cutting tools, or the like, which are mounted on the machine frame and are adapted to work successively in a timed relation on the workpieces which are removably mounted on an intermittently rotating turntable near the outer periphery thereof.

It is an object of the present invention to design a machine of the above-mentioned kind and to provide therein important and valuable improvements over similar machines as were previously known. More particularly, it is an object of the invention to provide such a machine which is of a relatively simple and inexpensive construction and easy to operate, and which is adapted especially for burring and finishing workpieces of many different kinds, sizes, and shapes.

An important feature of the invention consists in the provision of a single chain drive for rotating all of the workpieces about their own axes while traveling intermittently on a common turntable from one work station to another and while being machined at these work stations, and in the provision of simple means for interrupting the rotation of the individual workpieces while they are passing on the revolving turntable through a setup area in which the finished workpieces are exchanged for unfinished workpieces.

Another feature of the invention consists in the provision of work supports on the turntable and work-clamping fixtures on these work supports for the individual workpieces which remain in the clamping position under the action of a spring while the workpieces are being worked upon and are intermittently moving from one work station to another and which, while traveling through the setup area, release the workpieces against the action of the spring by engaging with stationary control cams.

A further feature of the invention consists in a particular very simple design of the work supports and work-clamping fixtures, each of which comprises a slide rod one end of which is adapted to engage with the mentioned stationary control cam or cams, while near its other end it carries a conical member which, while the work support is traveling through the work-station area, acts by the force of the mentioned spring upon clamping balls to force these balls radially outwards and against the inner wall of a bore in the workpiece which is placed upon the arborlike work support, so that the workpiece is thus rigidly clamped upon the work support. When the particular work support passes on the turntable through the setup area, the slide rod engages with the mentioned stationary control cam or cams and is lifted thereby against the action of the spring, whereby the conical member releases the clamping balls so that the workpiece may then be easily removed from the arborlike work support.

The machine according to the invention is designed so as to be operated very easily and quickly by a simple person, and it insures that the workpieces will be securely clamped while being worked upon and that they will be uniformly driven at all work stations.

According to another feature of the invention, the machine may be provided above the mentioned turntable with a second turntable which is driven synchronously with the first turntable and which for mounting long workpieces is provided with vertical backstops which are associated with the work supports on the first turntable and are movable in their axial direction. When the work supports and back stops are disposed within the work station area, each back stop is locked in the work-engaging position by means of a locking pin which is slidable by the action of a spring and is controlled by a cam rail, while within the setup area the back stop is unlocked and lifted to the work-releasing position by means of a roller which engages with another cam rail.

By the above-mentioned features of the invention it is possible also to mount and clamp very long workpieces on the machine in a very simple manner and so reliably that they can also be safely worked upon.

Another feature of the invention for working on very long workpieces consists in the provision of an auxiliary support intermediate each clamping fixture and the associated back stop in the form of a tonglike resilient gripping member for holding a long workpiece at least during the setup operation, that is, at least, until it is held by the back stop. This feature enables a single person to mount very long workpieces very easily and quickly in a vertical position on the machine without danger that they might fall over before the setup operation is completed.

For the purpose of burring and finishing bores and especially elongated apertures in disks, center-web wheels, or the like the invention further provides a supporting column with a support bracket thereon which is provided with a bushing in which a toolholder is mounted so as to be rotatable and axially slidable therein and which during the intermittent movement of the workpiece is actuated by a control cam on the turntable through a system of levers which are acted upon by a spring to shift the bushing for a considerable distance. For applying the tool on the tool holder against the workpiece or for lifting it therefrom for a small distance at one or more work stations so as to permit the workpiece to be turned about its axis for carrying out several operations at one station, the toolholder is also adjustable under the action of a spring by means of connecting rods which are mounted on the bushing so as to be slidable in the vertical direction and which are controlled by a cam track which is rotatable with the clamping fixture for the workpiece. In this manner the advantage is also attained that the tool will act resiliently upon the workpiece.

A further feature of the invention provides that for rough-burring of workpieces, and especially for burring the lateral sides of gears by means of a cutting tool, a supporting column of the machine carries a supporting arm which is provided with a toolholder which is movable for a considerable distance in the vertical direction and is actuated during the intermittent travel of the workpiece by a system of levers which are acted upon by a spring and are moved by a control cam which is mounted on the turntable. This toolholder and the tool thereon is then movable toward and into working engagement with the workpiece by the action of a further spring which is supported by the supporting arm.

In connection with the above-mentioned features and when employing a cutting tool for removing a coarse burr, it constitutes a further advantageous feature of the invention to provide a guide roller which is connected to the toolholder or cutting tool and is adapted to roll along a level part of the workpiece.

A machine according to the invention in which all of the features as mentioned above and in the following description are incorporated has great versatility and permits many different kinds of tools to be employed to carry out various operations. Especially, however, it is adapted to carry out automatically many different burring and finishing operations on large series of workpieces of the same kind in a mass production thereof.

These as well as still further objects, features, and advantages of the present invention will become more clearly apparent from the following detailed description thereof which is to be read with reference to the accompanying drawings, in which—

FIGURE 3 shows an enlarged front view partly in section, of a work-clamping fixture together with the means for operating the same;

FIGURE 4 shows a partial front view of a machine according to a modification of the invention which is provided with a second turntable;

FIGURE 5 shows a partial plan view of the machine according to FIGURE 4;

FIGURE 6 shows an enlarged front view, partly in section, of a back stop according to the invention;

FIGURE 7 shows a cross section taken along line VII—VII of FIGURE 6;

FIGURE 8 shows a front view, partly in section, of a tool-supporting column with a supporting bracket thereon and a rotary tool mounted thereon;

FIGURE 9 shows a plan view of a workpiece in the form of a disk with elongated holes therein; while FIGURE 10 shows a front view, partly in section, of a tool-supporting column with a supporting arm and a non-rotary cutting tool mounted thereon.

Figure 1:
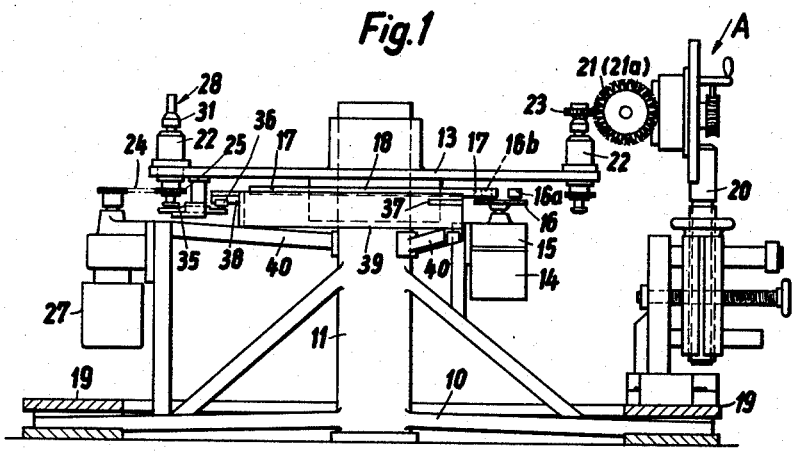
FIGURE 1 shows a front view, partly in section, of the machine according to the invention.
Figure 2:
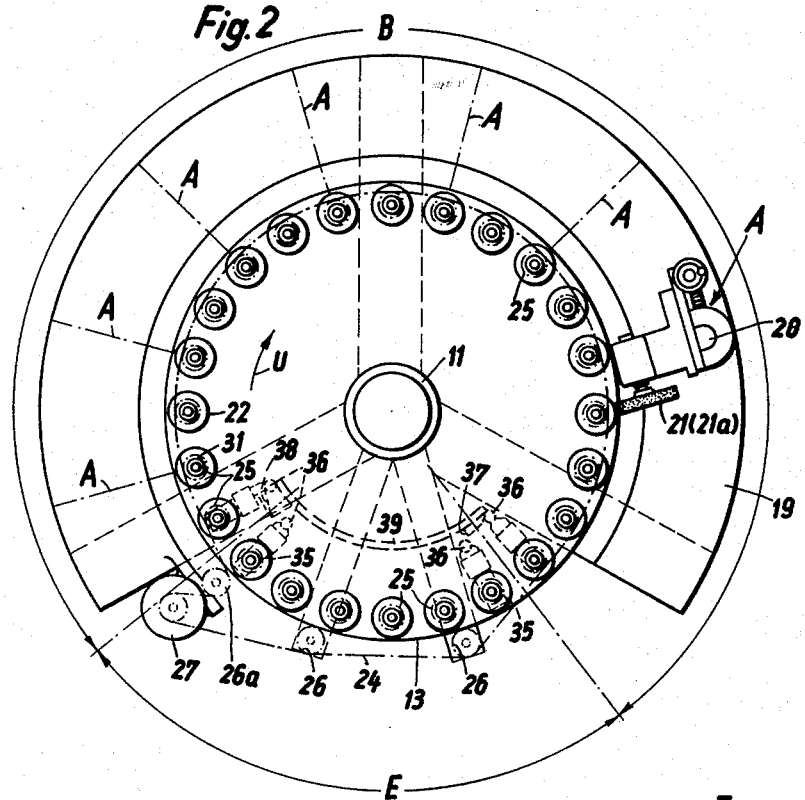
FIGURE 2 shows a plan view of the machine according to FIGURE 1.

Referring first particularly to FIGURES 1 to 3 of the drawings, the burring and finishing machine according to the invention comprises a stationary machine frame 10 which has a central column 11 on which a turntable 13 is rotatably mounted. Turntable 13 is adapted to be driven in a certain cadence or pilgrim step by a gear 15 which, in turn, is driven by a motor 14 which is mounted, for example, on frame 10. This kind of movement may be effected, for example, by a crank 16 which is driven by motor 14 and the crankpins 16a, 16b of which engage into radial slots 17 in a driving plate 18 which is rigidly secured to turntable 13. In place of this, it is also possible to effect the intermittent drive also by means of a mangle gear, a Maltese cross, a gear wheel or the like.

Around the turnable 13, a plurality of suitable tools 21 are mounted, for example, brush wheels 21a, as indicated in FIGURES 1 and 2, milling cutters 21b, as indicated in FIGURE 8, or cutting tools 21c, as indicated in FIGURE 10, which are adjustable to different positions by suitable supporting and adjusting means 20 which are mounted, for example, on a stationary ring 19 on frame 10. These tools 21 form the different work stations A. According to a preferred embodiment of the invention, six or eight work stations A are preferably provided which together form the work area B. The individual tools 21 are preferably mounted on conventional means, such as a cross or compound slide, swivel arms, or the like, in a manner so as to be slidable and rotatable in any direction, and they may also be fixed in any adjusted position in accordance with the workpiece and the kind of work to be carried out thereon.

Along and near its periphery, turntable 13 carries a large number of work supports 22 at equal distances from each other on which workpieces 23 may be rotatably mounted which may be of many different kinds, for example, gears 23, disks 23a, pinion shafts 23b, bolts, or the like. These workpieces 23 are fed toward to the tools 21 in a timed succession by an appropriate intermittent rotation of turntable 13 and they may thus be subjected to a series of similar or different operations by the various tools 21 at the work stations A.

During their movement within the work area B, the workpieces 23 are positively rotated about their own axes by means of a single chain 24 which drives the sprocket wheels 25 on the shafts 22b of work supports 22. While passing through the setup area E, as indicated in FIGURE 2, where no tools 21 are provided, the workpieces 23 are released from chain 24 and are thus not rotated thereby. For this purpose, chain 24 disengages from sprocket wheels 25 on the work supports 22 by passing over guide wheels 26 and 26a. Chain 24 is driven by a motor 27. Guide wheel 26a is designed so as also to serve as a chain tightener.

Work supports 22 carry work-clamping fixtures 28 which, when they are within the work area B, are held under tension under the action of a spring 29. For this purpose, the tubular shaft 22b of each work support 22 contains a slide rod 22a which is movable in its axial direction within shaft 22b which, in turn, is rotatably mounted on roller bearings 30 and carries on its upper end an arborlike head 31 which is removably connected to shaft 22b so as to be driven thereby and which is adapted to support a workpiece 23. Each work-clamping fixture 28 in the upper end of the work-receiving head 31 is provided with radially adjustable clamping balls 32 which are adapted to engage with a conical member 33 which is connected to slide rod 22a. While the respective work support 22 is within the work area B, spring 29 presses slide rod 22a and thus also the conical member 33 downwardly, whereby balls 32 are forced radially outwards and against the inner wall of workpiece 32 so as to grip the same. The workpiece 32 will then be rotated by chain 24 through sprocket wheel 25, shaft 22b, and the receiving head 31.

While passing through the setup area E, slide rod 22a and thus also the conical member 33 are pushed upwardly against the action of spring 29 so that the work-clamping fixture 28 will be moved to the releasing position in which balls 32 are no longer pressed radially against the inner wall of workpiece 23 and the latter may be easily removed from the receiving head 31 and another workpiece may be applied thereon. For effecting this releasing movement, slide rod 22a is provided in its lower end with a ball 34 which is adapted to roll up and along a slidable cam member 35 as soon as the latter is moved under slide rod 22a. Although in FIGURE 2, such cams 35 are indicated in dotted lines only in association with the slide rods 22a or two work supports 22 adjacent to each end of the setup area E, similar cams 35 are provided for all work supports 22. Cam members 35 are slidably mounted on turntable 13 and each of them carries a roller 36 which is rotatable along stationary cams 37 or 38 and thereby controls the movement of cam member 35. Cams 37 and 38 are mounted on an arcuate member 39 which is secured by brackets 40 to the machine frame 10.

When turntable 13 is turned in the clockwise direction, as shown in FIGURE 2 by the arrow U, roller 36 of one of the work supports 22 first engages at the beginning of the setup area E upon cam 37, whereby the slidable cam member 35 is shifted radially toward the outside and underneath the slide rod 22a, so that the latter is lifted against the action of spring 29 whereby the clamping fixture 28 is released. When during the continued movement of turntable 13 the same roller 36 reaches the end of the setup area E, it engages with the inner cam surface 38 so that cam member 38 is shifted radially toward the inside, whereby slide rod 22a is released and moved downwardly by the action of spring 29 so that the clamping fixture 28 is moved to its clamping position. The operation of the various clamping fixtures 28 of clamping and releasing the workpieces occurs therefore fully automatically.

FIGURES 4 to 7 illustrate a modification of the invention in which above the turntable 13 a second turntable 41 is provided which revolves synchronously with turntable 13 and carries vertical back stops 42 which are adjustable in the axial direction for supporting long workpieces, for example, pinion shafts 23b. When during the clockwise movement of turntables 13 and 41 these back stops 42 move into the work area B, they will be moved automatically into the work-engaging position in which the center 42a of the respective back stop then engages from above with the workpiece 23b so as to hold the same. Each back stop 42 is then locked in this work-engaging position by a slidable locking pin 43 which is held in the locking position by a spring 44. The operation of locking pin 43 is controlled by stationary cams 45 and 45a. When during the revolution of the turntables one of the back stops 42 reaches the beginning of the set-up area E, a roller 46 engages with cam 45 and is thereby pushed radially toward the outside of turntable 41 against the action of spring 44, whereby locking pin 43 is shifted to the releasing position in which it is arrested by the following upward movement of back stop 42 in a manner as subsequently described. Cams 45 and 45a are mounted on an arcuate member 47 which is secured by brackets 48 to column 11. As already indicated, cam 45 is disposed at the beginning of the setup area E so that the back stops 42 will be unlocked already at this point. Cam 45a is mounted at the end of the setup area E, as seen in the direction of movement shown by the arrow U, so that locking pin 43 will be held in the unlocked position until back stop 42 has again been shifted downwardly to its work-engaging position in the manner as subsequently described. After roller 46 disengages from cam 45a, back stop 42 again moves under the action of spring 44 to its locking position.

In order to shift back stops 42 automatically in the axial direction from the work-engaging position to the work-releasing position and vice versa, each back stop 42 has a roller 49 which is adapted to engage with a cam rail 50. This cam rail 50 is likewise mounted on the arcuate supporting member 47 within the setup area E, as illustrated in FIGURE 5, but it begins slightly later than cam 45 for locking pin 43, as seen in the direction of revolution U. Thus, each back stop 42 is at first released from its work-engaging position, whereupon roller 49 runs upon cam rail 50 which at this point is inclined in the upward direction. The released back stop 42 is thereby moved axially for a suitable distance in the upward direction so as to disengage completely from the workpiece 23b.

As indicated in FIGURE 4, only the first part of cam rail 50 extends obliquely upwards, whereas the following main part of the rail extends horizontally. This main part holds the back stops 42 in the elevated position until they reach a point near the end of the setup area E where rail 50 terminates in a downwardly inclined cam surface 50b. Opposite to but slightly higher than this cam surface 50b is another cam rail 12 which extends obliquely downwards and against the lower side of which the roller 49 then engages, whereby the back stops 42 are moved vertically downwards to the work-engaging position. As soon as back stop 42 arrives in this position, roller 46 on locking pin 43 disengages from cam 45a so that locking pin 43 is moved by spring 44 into its locking position in which it engages into a groove 42b in the shaft of back stop 42. In this work-engaging position, the center 42a of back stop 42 engages from above into workpiece 23b and centers the same. When it reaches the setup area E, however, workpiece 23B will be automatically released from back stop 42 and may then be exchanged for another workpiece.

Between each clamping fixture 28 on the lower turntable 13 and the associated back stop 42 on the upper turntable 41 an auxiliary supporting element 51 is provided for holding long workpieces 23b during the setup operation and as long as they are not held by back stop 42. These supporting elements 51 are provided with tong-like resilient gripping members 52 which are adapted to grip the workpieces 23b.

FIGURE 8 illustrates a further embodiment of the invention which is primarily intended for burring and finishing bores and especially elongated apertures 53 in disks 23a, center-web wheels, or the like. For supporting the tool, for example, a milling cutter 21b, the tool-supporting column 20 is extended by an angular bracket-like arm 55 which supports a bushing 56. This bushing 56 is mounted in bracket 55 so as to be movable therein for a considerable distance in a vertical direction by means of interconnected levers 57, 58, and 59 which are acted upon by a tension spring 60 which is connected at its upper end to a rod 61 which is secured to bracket 55. Lever 57 is pivotably mounted at 62 on column 20, while lever 58 is pivotably connected at 63 to lever 57 and at 64 to lever 59 which is rigidly connected to bushing 56. A control cam 65 which is mounted on turntable 13 is slidable along a projection 57a on lever 57 to move levers 57, 58, and 59 against the action of spring 60.

At each successive step of the intermittent rotation of turntable 13 and thus also of each workpiece 23a, control cam 65 disengages from lever 57 so that levers 57, 58, and 59 and thus also bushing 56 can be pulled upwardly by spring 60, whereby tool 21b will also move upwardly and disengage from workpiece 23a, thus permitting the latter to move along underneath the tool, as will be subsequently described.

Bushing 56 supports a toolholder 54 which is rotatable and axially slidable therein. The rotary driving movement of toolholder 54 is produced by any suitable driving means, not shown, such as a belt, chain, or the like, through a drive pulley 66. For moving the tool 21b into the workpiece 23b and for lifting it therefrom for a sufficient distance to permit the workpiece to be turned from one of the apertures 53, 53a, 53b 53c (FIGURE 9), to another, toolholder 54 is axially movable for a limited extent by means of interconnected rods 67, 68, 69, and 70 which are guided in bushing 56 to be movable in the vertical direction and are acted upon by a spring 71 which is supported by an abutment 72 which is connected to bracket 55. The movement of these interconnected rods 67 to 70 is controlled by a cam track 73 which is secured to the clamping fixture 28 for workpiece 23a. Whenever the workpiece is turned for one step about its axis to shift it from one aperture 53 to another relative to tool 21b, rods 67 to 70 are lifted by cam track 73 so that toolholder 54 will also be lifted and tool 21b will be sufficiently raised from the workpiece. By the provision of spring 71, tool 21b will also be brought into resilient engagement with workpiece 23a.

FIGURE 10 illustrates a further modification of the machine according to the invention which is similar to the embodiment according to FIGURE 8 but intended for rough-burring, for example, of the lateral sides 23b of a gear 23 by means of a cutting tool 21c. The tool-supporting column 20 is also in this case extended laterally by an arm 55 which supports a tool holder 54 which, however, is movable for a greater distance in the vertical direction. Toolholder 54 is acted upon by a spring 74 which tends to move the toolholder and thus the tool 21c toward the workpiece 23. The operation of toolholder 54 is controlled in the same manner as shown in FIGURE 8 by interconnected levers 57, 58, and 59 which are likewise acted upon by a tension spring 60. The strength of this spring 60 is, however, greater than that of spring 74. As soon as cam 65 disengages from lever 57, toolholder 54 will be moved upwardly under the action of the stronger spring 60 and against the action of spring 74, so that tool 21c will be disengaged from workpiece 23 which may then be moved to the next work station by the intermittent rotation of turntable 13. For carrying out one particular operation at one work station, the projection 57a on lever 57 engages with the control cam 65, whereby levers 57, 58, and 59 are moved downwardly against the action of spring 60. Lever 59 engages with a slight play into a recess 75 in toolholder 54. The cutting 21c then engages with workpiece 23 under the action of the compression spring 74. Toolholder 54 also carries a guide roller 76 which runs along a level surface of workpiece 23 and determines the proper working position of cutting tool 21c relative to workpiece 23.

Of course, in accordance with the particular kind of work to be carried out it is also possible to employ different kinds of tools than those as previously mentioned, for example, saw blades, grinders, polishing tools, or the like. Depending upon the type of tool employed, it is possible to use the machine for burring and cleaning workpieces, for finishing their surfaces, and also for polishing or roughening the surfaces. Within the setup area E, the workpieces may be inserted into and removed from the machine either by hand or also fully automatically.

The intermittent rotation of the turntable by means of a Maltese cross or the like may be adjusted and controlled by means of a timing relay in accordance with the size and shape of the workpieces to be machined.

The tools at the different work stations may be adjusted to different positions within each station and also toward any desired directions. Thus it is possible to employ the machine also for working on gears of different diameters, tooth shapes, and pitches.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A machine tool comprising a machine frame, at least one turntable rotatably mounted on said frame, means for driving said turntable, a plurality of work supports rotatably mounted on said turntable near the periphery thereof, a sprocket wheel secured to each of said work supports, work-clamping means on each work support, spring means for normally maintaining said clamping means in a clamping position, a single chain engaging with all of the sprocket wheels disposed during the rotation of said turntable within a fixed arcuate work area for rotating said work supports within said area about their own axes, means for driving said chain, means for guiding said chain so as to disengage the same from said sprocket wheels within a fixed setup area so that said work supports are not driven about their axes within said setup area to permit workpieces to be mounted on said work supports and to be disengaged from said clamping means and removed from said work supports, a cam member for each clamping means and being movably mounted on said turntable for moving said clamping means within said setup area to a work-releasing position against the action of said spring means during movement of said cam member in one direction, stationary cam means in the region of said setup area and cooperating with the cam members of the work supports in the setup area to move said cam members in said one direction, and a plurality of adjustable tools mounted on said frame and spaced peripherally from each other within said work area for carrying out a plurality of operations on each of said workpieces.

2. A machine tool comprising a machine frame, at least one turntable rotatably mounted on said frame, means for driving said turntable so as to carry out a continuous step-by-step movement, a plurality of work supports rotatably mounted on said turntable near the periphery thereof, each of said work supports comprising a member secured to said turntable and forming a bushing, a tubular shaft rotatably mounted within said bushing, a sprocket wheel secured to said shaft, a tubular arborlike work-supporting member removably secured to the upper end of said shaft and adapted to receive a workpiece, a slide rod extending through and axially slidable within said shaft, a conical member connected to the upper end of said shaft, a plurality of clamping balls in said arborlike work-supporting member adapted to be forced by said conical member in a radially outward direction to press against the wall of a bore in said workpiece so as to clamp the same to said supporting member, and spring means acting upon said slide rod so as to maintain said conical member and said balls normally in a work-clamping position, a single chain engaging with all of the sprocket wheels disposed during the step-by-step rotation of said turntable within a fixed arcuate work area for rotating said shafts including said slide rods and said work-supporting members within said area about their own axes, means for guiding said chain so as to disengage the same from said sprocket wheels within a fixed setup area so that said shafts are not driven about their axes within said setup area to permit said workpieces to be mounted on and removed from said work-supporting members, a cam member for each work supporting member, each of said cam members being mounted on said turntable so as to lift the slide rod together with said conical member against the action of said spring means during radial movement of the cam member in one direction so that said balls are then released from said workpieces, stationary cam means fixedly mounted on said frame in the region of said setup area and engaging the cam member of each work support member during its passage through said setup are to move the respective cam member in said one direction to thus release the work pieces from the work support member in said setup area, and a plurality of adjustable tools mounted on said frame and spaced peripherally from each other within said work area for carrying out a plurality of operations on each of said workpieces.

3. A machine tool comprising a machine frame having at least one tool-supporting column and an arm secured to said column, at least one turntable rotatably mounted on said frame, means for driving said turntable so as to carry out a continuous step-by-step movement, a plurality of work supports rotatably mounted on said turntable near the periphery thereof, a sprocket wheel secured to each of said work supports, a single chain engaging with all of the sprocket wheels disposed during the rotation of said turntable within a fixed arcuate work area for rotating said work supports within said area about their own axes, means for driving said chain, means for guiding said chain so as to disengage the same from said sprocket wheels within a fixed setup area to permit workpieces to be mounted on and removed from said work supports, a plurality of tool units mounted on said frame and spaced peripherally from each other at different work stations within said work area for carrying out a plurality of operations on each of said workpieces, at least one of said units comprising a bushing mounted on said arm of said column, a toolholder mounted in said bushing so as to be slidable in a vertical direction relative to said work supports and adapted to hold a tool at one end thereof, connecting means pivotably mounted on said column and connected at one end to said bushing, cam means mounted on said turntable and adapted to engage with the other end of said connecting means for moving said bushing downwardly and said tool to a level closely above said workpiece at least at one of said work stations, first spring means acting upon said connecting means for elevating said connecting means and said toolholder when said connecting means disengage from said cam means to disengage said tool from said workpiece when said turntable moves said workpiece from said work station to the next station, and second spring means acting upon said toolholder for moving said tool into a resilient working engagement with said workpiece when said other end of said connecting means engages with said cam means.

4. A machine tool comprising a machine frame having at least one tool-supporting column and an arm secured to said column, at least one turntable rotatably mounted on said frame, means for driving said turntable so as to carry out a continuous step-by-step movement, a plurality of work supports rotatably mounted on said turntable near the periphery thereof, a sprocket wheel secured to each of said work supports, a single chain engaging with all of the sprocket wheels disposed during the rotation of said turntable within a fixed arcuate work area for rotating said work supports within said area about their own axes, means for driving said chain, means for guiding said chain so as to disengage the same from said sprocket wheels within a fixed setup area to permit workpieces to be mounted on and removed from said work supports, a plurality of tool units mounted on said frame and spaced peripherally from each other at different work stations within said work area for carrying out a plurality of operations on each of said workpieces, at least one of said units comprising a bushing mounted on said arm of said column, a toolholder mounted in said bushing so as to be slidable in a vertical direction relative to said work supports and adapted to hold a tool at one end thereof, connecting means pivotably mounted on said column and connected at one end to said bushing, cam means mounted on said turntable and adapted to engage with the other end of said connecting means for moving said tool holder downwardly and said tool to a level closely above said workpiece at least at one of said work stations, first spring means acting upon said connecting means for elevating said connecting means and said toolholder when said connecting means disengage from said cam means to disengage said tool from said workpiece when said turntable moves said workpiece from said work station to the next station, second spring means acting upon said toolholder for moving said tool into a resilient working engagement with said workpiece when said other end of said connecting means engages with said cam means, and a guide member mounted on said toolholder and adapted to engage with and move along a level part of said workpiece at said work station to limit the action of said tool on said workpiece.

5. A machine tool comprising a machine frame, having at least one tool-supporting column thereon and an arm secured to said column, at least one turntable rotatably mounted on said frame, means for driving said turntable so as to carry out a continuous step-by-step movement, a plurality of work supports rotatably mounted on said turntable near the periphery thereof, a sprocket wheel secured to each of said work supports, a single chain engaging with all of the sprocket wheels disposed during the rotation of said turntable within a fixed arcuate work area for rotating said work supports within said area about their own axes, means for driving said chain, means for guiding said chain so as to disengage the same from said sprocket wheels within a fixed setup area so that said work supports are not driven about their axes within said setup area to permit workpieces to be mounted on and removed from said work supports, a plurality of tool units mounted on said frame and spaced peripherally from each other at different work stations within said work area for carrying out a plurality of operations on each of said workpieces, at least one of said tool units comprising a bushing mounted on said arm of said column so as to be axially slidable in a vertical direction relative to said arm, a toolholder mounted in said bushing so as to be axially slidable and rotatable relative to said bushing and adapted to hold a tool at one end thereof, driving means for rotating said toolholder, connecting means pivotably mounted on said column and connected at one end to said bushing, cam means mounted on said turntable and adapted to engage with the other end of said connecting means for moving said bushing downwardly at least at one of said work stations, first spring means acting upon said connecting means for elevating said bushing and also said toolholder when said connecting means disengage from said cam means to disengage said tool from said workpiece when said turntable moves said workpiece from said work station to the next station, second connecting means rotatably connected at one end to said toolholder and slidable with its other end along a level surface of one of said work supports, second cam means on parts of said surface and rotatable with said work support and adapted to engage with said other end of said second connecting means for elevating said toolholder sufficiently to disengage said tool from said workpiece to permit said workpiece to be turned for a certain distance about its axis by said work support after each of several operations of said tool on said workpiece at least at one of said work stations, and second spring means interconnecting said bushing and said second connecting means for moving said tool into a resilient working engagement with said workpiece when said other end of said second connecting means engages with said level surface.

6. In a machine tool, in combination, support means; a turntable mounted on said support means rotatable about its axis; a plurality of work supports rotatably mounted on said turntable near the periphery thereof; means for driving said turntable step by step for moving said work supports between a plurality of stations; means operatively connected to each of said work supports for turning the same about its axis; at least one tool unit mounted on said support means adjacent the periphery of said turntable at one of said stations and comprising a guide member mounted in said support means slidably toward and away from a workpiece mounted in a work support located at any instant at said one station, and a tool holder slidably guided in said guide member and adapted to hold a tool at one end thereof; connecting means pivotally mounted on said support means and connected at one end thereof to said guide member; cam means mounted on said turntable and adapted to engage with the other end of said connecting means for moving said guide member toward said workpiece and the tool to a level closely adjacent said workpiece; first spring means acting upon said connecting means for moving the latter and said tool holder away from said workpiece when said connecting means is disengaged from said cam means; and second spring means acting upon said tool holder for moving the tool carried thereby into a resilient working engagement with said workpiece when said other end of said connecting means engages with said cam means.

References Cited by the Examiner

UNITED STATES PATENTS

| | | | |
|---|---|---|---|
| 1,235,957 | 8/17 | Bidwell | 279—2 |
| 1,761,032 | 6/30 | Baker | 10—72.5 |
| 1,947,957 | 2/34 | Tillman | 269—52 |
| 2,107,543 | 2/38 | Miller | 90—1.4 |
| 2,272,055 | 2/42 | Carlson | 51—108 |
| 2,377,992 | 6/45 | Carlson | 51—53 |
| 2,454,269 | 11/48 | Braucher | 90—14 |
| 2,649,668 | 8/53 | Zinn et al. | 51—108 X |
| 2,726,578 | 12/55 | Creek | 90—14 |
| 2,970,842 | 2/61 | Drew | 279—2 |

FOREIGN PATENTS 37,652  8/06  Switzerland.

ANDREW R. JUHASZ, *Primary Examiner.*

LEON PEAR, *Examiner.*